United States Patent
Cymbal et al.

(10) Patent No.: US 10,480,553 B2
(45) Date of Patent: Nov. 19, 2019

(54) SHAFT ASSEMBLY

(71) Applicant: STEERING SOLUTIONS IP HOLDING CORPORATION, Saginaw, MI (US)

(72) Inventors: William D. Cymbal, Freeland, MI (US); Joseph R. Streng, Freeland, MI (US); Steven R. Burk, Frankenmuth, MI (US); Patrick G. Haas, Fenton, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 175 days.

(21) Appl. No.: 15/726,975

(22) Filed: Oct. 6, 2017

(65) Prior Publication Data
US 2019/0107129 A1    Apr. 11, 2019

(51) Int. Cl.
*F16B 2/06* (2006.01)
*F16D 3/44* (2006.01)
*F16D 3/10* (2006.01)

(52) U.S. Cl.
CPC ............... *F16B 2/065* (2013.01); *F16D 3/10* (2013.01); *F16D 3/44* (2013.01)

(58) Field of Classification Search
CPC ... F16D 3/387; F16D 3/10; F16D 3/44; F16D 1/0864; F16D 1/116; F16B 2/065; B62D 1/10; B62D 1/185; B62D 1/20
See application file for complete search history.

(56) References Cited

U.S. PATENT DOCUMENTS

| | | | | |
|---|---|---|---|---|
| 2,448,278 A | * | 8/1948 | Ronning | F16D 1/116 192/71 |
| 2,885,231 A | * | 5/1959 | Smith | F16D 1/116 279/97 |
| 2,948,559 A | * | 8/1960 | Recker | F16D 1/116 279/77 |
| 2,997,320 A | * | 8/1961 | Sutherland | F16D 1/116 403/316 |
| 3,923,409 A | * | 12/1975 | Stoner | F16B 2/065 403/290 |
| 4,068,965 A | * | 1/1978 | Lichti | F16D 1/04 403/313 |
| 4,645,368 A | * | 2/1987 | Simpson | F16D 1/116 403/324 |
| 4,899,611 A | * | 2/1990 | Pinna | B62D 1/20 74/492 |
| 5,090,833 A | * | 2/1992 | Oertle | B62D 1/20 403/12 |
| 5,253,949 A | * | 10/1993 | Oxley | B62D 1/16 403/155 |
| 5,358,350 A | * | 10/1994 | Oertle | B62D 1/20 403/12 |

(Continued)

*Primary Examiner* — Daniel J Wiley

(57) ABSTRACT

A shaft assembly includes a yoke defining a first bore that extends from a first face towards a second face along a first axis. The first bore has an inner surface that defines a key that extends towards the first axis and a first bore first flat that extends along the first axis and is spaced apart from the key. A second bore that extends from a third face towards a fourth face along a second axis that is disposed transverse to the first axis. The third face and the fourth face each extend between the first face and the second face.

14 Claims, 3 Drawing Sheets

(56) References Cited

U.S. PATENT DOCUMENTS

| | | | | | |
|---|---|---|---|---|---|
| 5,366,316 | A | * | 11/1994 | Cymbal | B62D 1/16 403/359.2 |
| 5,403,111 | A | * | 4/1995 | Wey | F16B 21/16 403/290 |
| 5,580,184 | A | * | 12/1996 | Riccitelli | F16D 1/0864 280/779 |
| 5,628,578 | A | * | 5/1997 | McClanahan | B62D 1/16 403/13 |
| 7,179,009 | B2 | * | 2/2007 | Stimpfl | B62D 1/20 403/53 |
| 7,488,134 | B2 | * | 2/2009 | Kinme | B62D 1/16 403/12 |
| 7,666,101 | B2 | * | 2/2010 | Kakimoto | F16D 1/0864 403/236 |
| 8,262,309 | B2 | * | 9/2012 | Dallara | F16D 3/387 403/233 |
| 9,086,097 | B2 | * | 7/2015 | Mielke | F16D 1/0864 |
| 9,581,205 | B2 | * | 2/2017 | Knoth | F16D 1/0864 |
| 2004/0091308 | A1 | * | 5/2004 | Kinme | F16D 3/387 403/235 |
| 2006/0073902 | A1 | * | 4/2006 | Sekine | B62D 1/16 464/134 |
| 2014/0178127 | A1 | * | 6/2014 | Mottier | B62D 1/20 403/373 |
| 2014/0349773 | A1 | * | 11/2014 | Anders | B62D 1/16 464/182 |

* cited by examiner

SHAFT ASSEMBLY

BACKGROUND

The present disclosure relates to a clamp yoke assembly.

A vehicle may be provided with a clamp yoke that is coupled to a shaft that aids in the transmission of a torque to a component of the vehicle. A bolt may be inserted into the clamp yoke that applies a force to the clamp yoke to deform the clamp yoke about the shaft to operatively connect the clamp yoke to the shaft.

Accordingly, it is desirable to provide a reliable connection between the clamp yoke and the steering shaft or pinion shaft.

SUMMARY

According to an embodiment of the present disclosure, a shaft assembly is provided. The shaft assembly includes a yoke defining a first bore that extends from a first face towards a second face along a first axis. The first bore has an inner surface that defines a key that extends towards the first axis and a first bore first flat that extends along the first axis and is spaced apart from the key. A second bore that extends from a third face towards a fourth face along a second axis that is disposed transverse to the first axis. The third face and the fourth face each extend between the first face and the second face.

According to another embodiment of the present disclosure, a shaft assembly is provided. The shaft assembly includes a yoke having a first face, a second face disposed opposite the first face, a third face extending between the first face and the second face, a fourth face disposed opposite the third face and extending between the first face and the second face, and a fifth face extending between the first face, the second face, the third face, and the fourth face. The yoke defines a first bore has a key and a first bore first flat that extends from the first face towards the second face along a first axis.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 5:
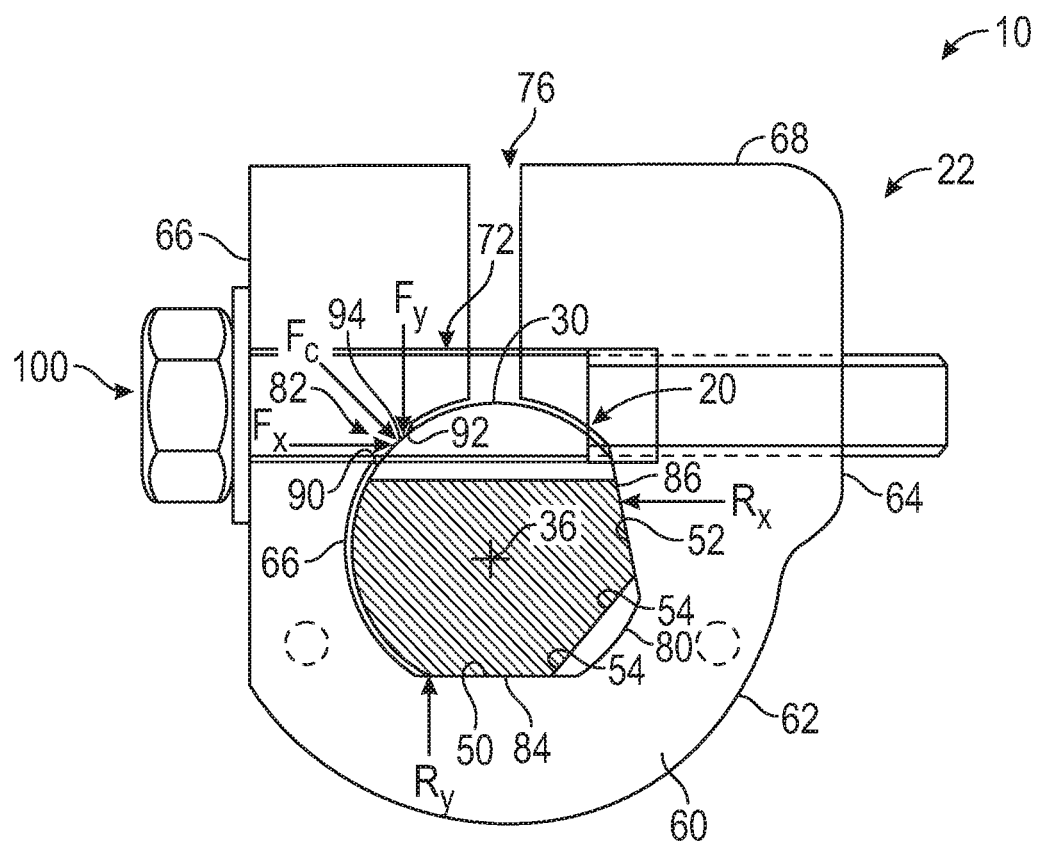
FIG. 5 is an elevational view of the shaft inserted within the yoke illustrating clamping loads.

Referring to FIG. 5, a shaft assembly 10 is shown. The shaft assembly 10 may be provided as part of a system, such as a steering system, that transmits a torque from one steering system component to another. For example, the shaft assembly 10 may be a steering shaft assembly that connects a steering wheel to a steering mechanism or a steering gear. The shaft assembly 10 includes a shaft 20 and a yoke 22.

Figure 1:
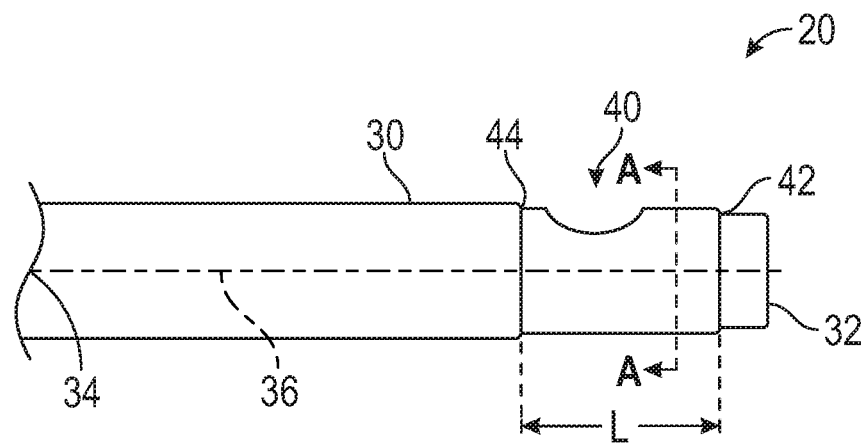
FIG. 1 is a partial side view of a shaft.

Referring to FIG. 1, the shaft 20 is at least partially received within the yoke 22. The shaft 20 includes an outer surface 30 that extends between a first shaft end 32 and a second shaft end 34 along a first axis 36.

The outer surface 30 defines a shaft notch 40 that is disposed proximate the first shaft end 32. The shaft notch 40 axially extends along the first axis 36 and extends across the shaft 20 in a direction that is transverse to the first axis 36. The shaft notch 40 defines a generally flat surface that is disposed substantially parallel to the first axis 36.

The shaft notch 40 is axially disposed between a first shoulder 42 and a second shoulder 44 of the shaft 20. The first shoulder 42 is disposed proximate the first shaft end 32 and is disposed generally perpendicular to the first axis 36. The second shoulder 44 is disposed between the shaft notch 40 and the second shaft end 34. The second shoulder 44 is disposed generally perpendicular to the first axis 36.

The shaft 20 may have a variable diameter or cross-sectional form over the length of the shaft 20 along the first axis 36. For example, the shaft 20 may have a first diameter between the first shoulder 42 and the first shaft end 32. The shaft 20 may have a second diameter between the first shoulder 42 and the shaft notch 40 and/or the second shoulder 44 that is greater than the first diameter. The shaft 20 may have a third diameter between the second shoulder 44 and the second shaft end 34 that is greater than the second diameter.

Figure 2:
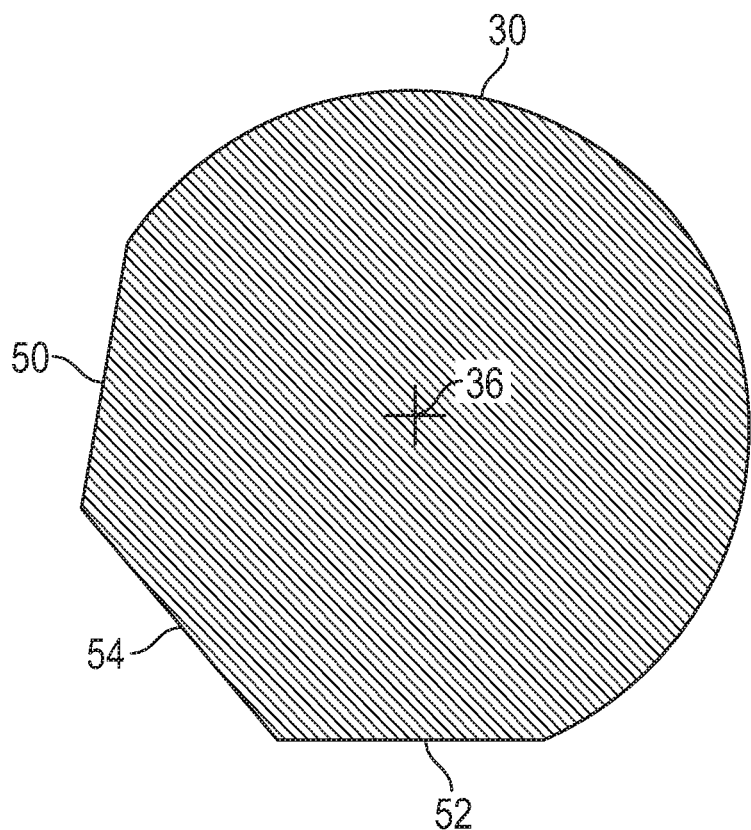
FIG. 2 is an end cross-sectional view of the shaft taken along line A-A of FIG. 1.

Referring to FIG. 2, is a cross-section taken along section line A-A between the first shoulder 42 and the second shoulder 44, the outer surface 30 of the shaft 20 defines a first flat 50, a second flat 52, and a third flat 54. The first flat 50 extends from the first shaft end 32 towards the second shaft end 34 along the first axis 36. The first flat 50 is disposed generally parallel to the fifth face 68. The second flat 52 is circumferentially spaced apart from the first flat 50 and extends from the first shaft end 32 towards the second shaft end 34 along the first axis 36. The third flat 54 circumferentially extends between the first flat 50 and the second flat 52. The third flat 54 extends from the first shaft end 32 towards the second shaft end 34 along the first axis 36.

Figure 3:
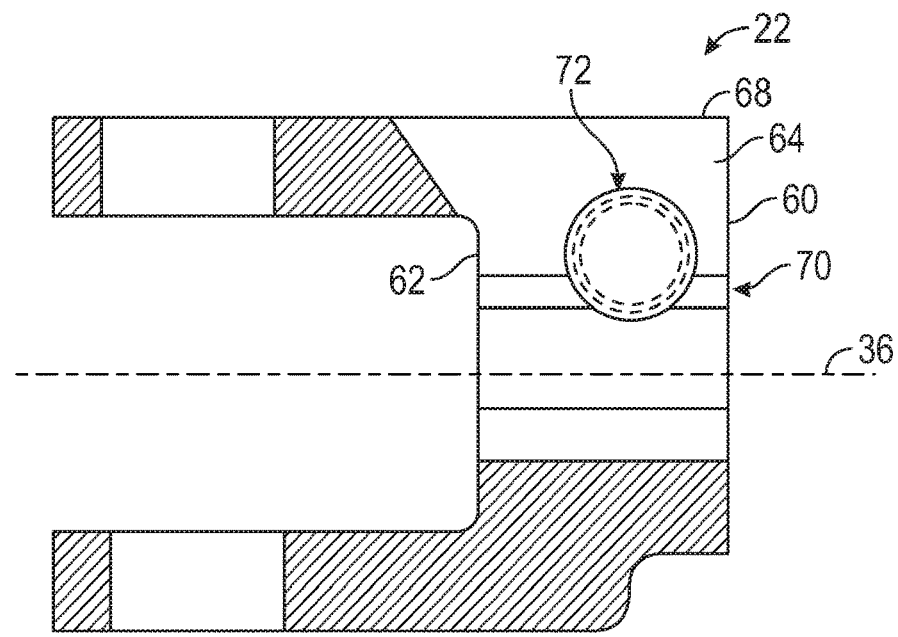
FIG. 3 is an elevational view of a yoke.
Figure 4:
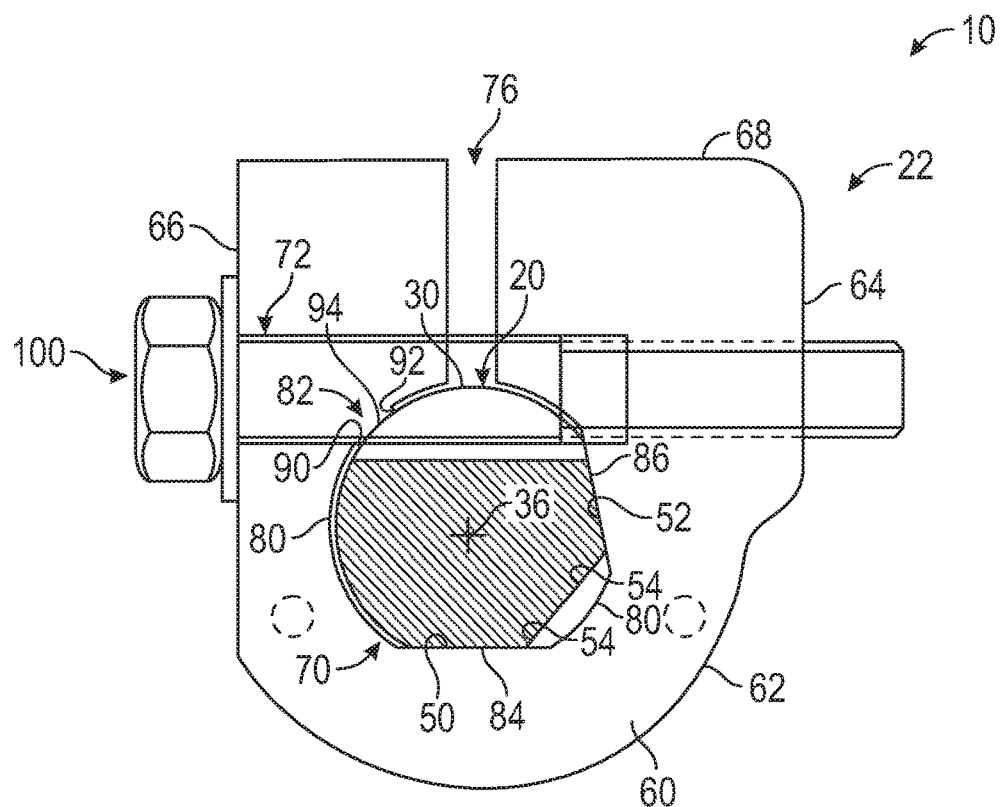
FIG. 4 is an elevational view of the yoke.

Referring to FIGS. 3 and 4, the yoke 22 includes a first face 60, a second face 62, a third face 64, a fourth face 66, and a fifth face 68. The second face 62 is disposed opposite the first face 60. The third face 64 extends between the first face 60 and the second face 62. The fourth face 66 is disposed opposite the third face 64 and extends between the first face 60 and the second face 62. The fifth face 68 extends between the first face 60, the second face 62, the third face 64, and the fourth face 66.

The yoke 22 defines a first bore 70 that extends along the first axis 36, a second bore 72 that extends along a second axis 74 that is disposed transverse to the first axis 36, and a notch 76.

The first bore 70 extends from the first face 60 towards the second face 62 along the first axis 36. The first bore 70 has a noncircular cross-sectional profile. The first bore 70 has an inner surface 80 that defines a key 82, a first bore first flat 84, and a first bore second flat 86. The inner surface 80 has a noncircular cross-sectional profile and the third flat 54 is spaced apart from the inner surface 80 of the first bore 70.

The key 82 extends from the inner surface 80 towards the first axis 36. The key 82 extends along the inner surface 80 from the first face 60 towards the second face 62. The key 82 is arranged to engage the outer surface 30 of the shaft 20, as shown in FIGS. 5 and 6. The key 82 is spaced apart from the first flat 50, the second flat 52, and the third flat 54. The key 82 is arranged to engage the outer surface of the shaft 20 proximate a portion of the shaft 20 that is disposed aft of the shaft notch 40.

The key 82 includes a first key surface 90, a second key surface 92, and a third key surface 94. The third key surface 94 extends between the first key surface 90 and the second key surface 92. The third key surface 94 of the key 82 engages the outer surface 30 of the shaft 20. The first key surface 90 and the second key surface 92 may become progressively closer to each other in a direction that extends from the inner surface 80 towards the third key surface 94.

The first bore first flat 84 is circumferentially spaced apart from the key 82. The first bore first flat 84 extends from the first shaft end 32 towards the second shaft end 34 along the first axis 36. The first bore first flat 84 is disposed generally parallel to the fifth face 68. The first bore first flat 84 is arranged to engage the first flat 50 of the shaft 20.

The first bore second flat 86 is circumferentially spaced apart from the key 82 and the first bore first flat 84. The first bore second flat 86 extends from the first shaft end 32 towards the second shaft and 34 along the first axis 36. The first bore second flat 86 is angled towards the key 82 in a direction that extends towards the fifth face 68. In such an arrangement, the first bore second flat 86 is disposed in a nonparallel and non-perpendicular relationship with respect to the first bore first flat 84. The first bore second flat 86 is arranged to engage the second flat 52 of the shaft 20.

The second bore 72 extends from the third face 64 towards the fourth face 66 along the second axis 74. The second bore 72 is arranged to receive a fastener 100 that extends along the second axis 74. The fastener 100 engages the flat surface of the shaft notch 40 to secure the shaft 20 and the yoke 22, as will be described in further detail.

The notch 76 extends from the first face 60 towards the second face 62 along the first axis 36. The notch 76 extends from the fifth face 68 towards the first bore 70 and/or the second bore 72 along an axis that is disposed transverse to both the first axis 36 and the second axis 74. The notch 76 extends at least partially through the second bore 72 and extends to the first bore 70.

Referring to FIG. 5, as the fastener 100 is torqued, the fastener 100 creates a force between the third face 64 and the fourth face 66. The force from the bolt torque causes the yoke 22 to deform and/or pivot and to apply a force, Fc, that may be broken down into components in the x-direction, Fx, and the y-direction, Fy, and begins closing the notch 76. As the third face 64 and the fourth face 66 become progressively closer together, the third key surface 94 of the key 82 engages or makes contact with the outer surface 30 of the shaft 20. The force, Fc, causes the first flat 50 to align with and engage with the first bore first flat 84 and causes the third flat 54 to align with and engage the first bore second flat 86. A reaction force, Rx, results between the second flat 52 and the first bore second flat 86 due to the inclination of the first bore second flat 86 and another reaction force, Ry, results between the first flat 50 and the first bore first flat 84. Due to the normality of the application of the Force, Fc, and the reaction forces Rx and Ry, the shaft 20 and the yoke 22 are capable of resisting substantial amounts of torsional and axial force.

While the present disclosure has been described in detail in connection with a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A shaft assembly, comprising:
   a yoke defining a first bore that extends from a first face towards a second face along a first axis, the first bore having an inner surface that defines a key that extends towards the first axis and a first bore first flat that extends along the first axis and is spaced apart from the key, and a second bore that extends from a third face towards a fourth face along a second axis that is disposed transverse to the first axis, the third face and the fourth face each extending between the first face and the second face, wherein the yoke defines a notch that extends from first face towards the second face and extends between the first bore and a fifth face that extends between the first face, the second face, the third face, and the fourth face; and
   a shaft having an outer surface extending between a first shaft end and a second shaft end along the first axis, the first shaft end being at least partially received within the first bore, wherein the outer surface defines a first flat that extends from the first shaft end towards the second shaft end, wherein the first flat is disposed parallel to the fifth face.

2. The shaft assembly of claim 1, wherein the key extends along the inner surface from the first face towards the second face.

3. The shaft assembly of claim 1, wherein the notch extends at least partially through the second bore.

4. The shaft assembly of claim 1, wherein the first flat engages the first bore first flat.

5. The shaft assembly of claim 1, wherein the key engages the outer surface and is spaced apart from the first flat.

6. A shaft assembly, comprising:
   a yoke having a first face, a second face disposed opposite the first face, a third face extending between the first face and the second face, a fourth face disposed opposite the third face and extending between the first face and the second face, and a fifth face extending between the first face, the second face, the third face, and the fourth face, the yoke defining a first bore having a key and a first bore first flat that extends from the first face towards the second face along a first axis, wherein the first bore has a first bore second flat that is spaced apart from the key and the first bore first flat, wherein the first bore first flat is disposed parallel to the fifth face.

7. The shaft assembly of claim 6, wherein the first bore second flat is angled towards the key in a direction that extends towards the fifth face.

8. The shaft assembly of claim 6, further comprising:
a shaft that is at least partially received within the first bore, the shaft having an outer surface that defines a first flat that extends from a first shaft end towards a second shaft end along the first axis.

9. The shaft assembly of claim 8, wherein the first bore first flat is arranged to engage the first flat.

10. The shaft assembly of claim 8, wherein the outer surface defines a second flat that extends from the first shaft end towards the second shaft end.

11. The shaft assembly of claim 10, wherein the first bore second flat engages the second flat.

12. A shaft assembly, comprising:
a yoke having a first face, a second face disposed opposite the first face, a third face extending between the first face and the second face, a fourth face disposed opposite the third face and extending between the first face and the second face, and a fifth face extending between the first face, the second face, the third face, and the fourth face, the yoke defining a first bore having a key and a first bore first flat that extends from the first face towards the second face along a first axis, wherein the first bore has a first bore second flat that is spaced apart from the key and the first bore first flat and
a shaft that is at least partially received within the first bore, the shaft having an outer surface that defines a first flat that extends from a first shaft end towards a second shaft end along the first axis, wherein the outer surface defines a second flat that extends from the first shaft end towards the second shaft end, wherein the first bore second flat engages the second flat, wherein the outer surface defines a third flat that extends from the first shaft end towards the second shaft end.

13. The shaft assembly of claim 12, wherein the third flat extends between the first flat and the second flat.

14. The shaft assembly of claim 12, wherein the third flat is spaced apart from the first bore.

* * * * *